(No Model.)
S. COONS & E. O. ROGERS.
LATHE CHUCK.
No. 518,136. Patented Apr. 10, 1894.
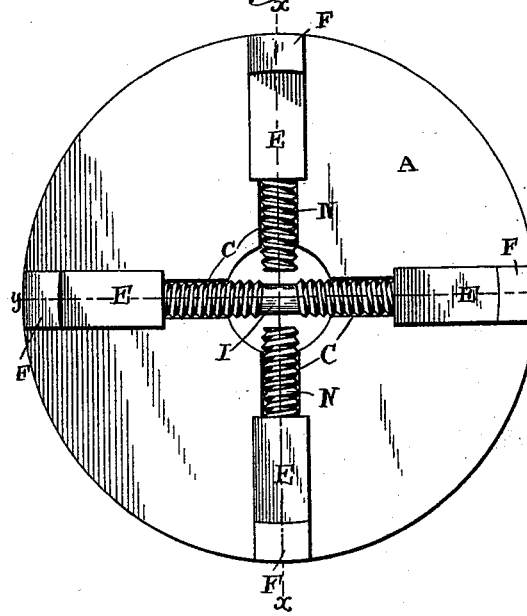
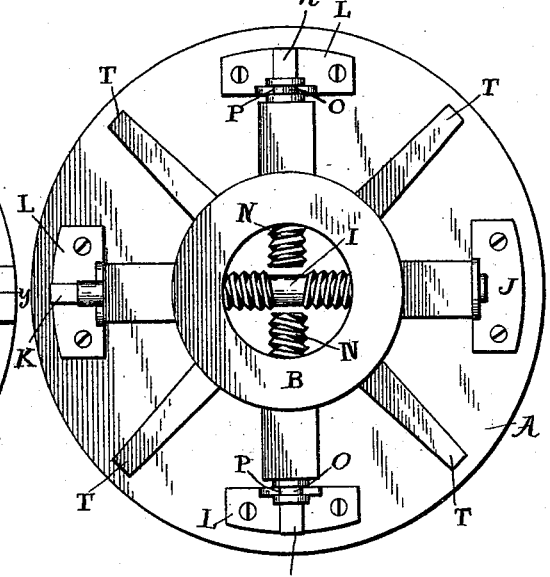
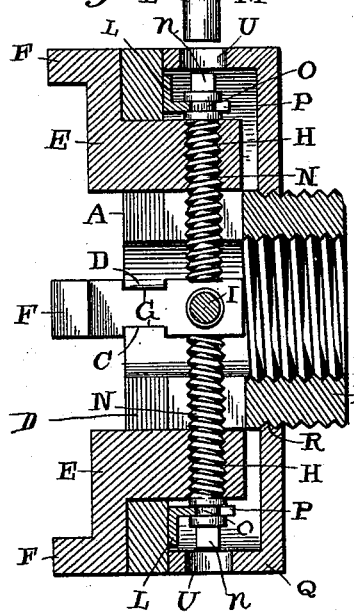
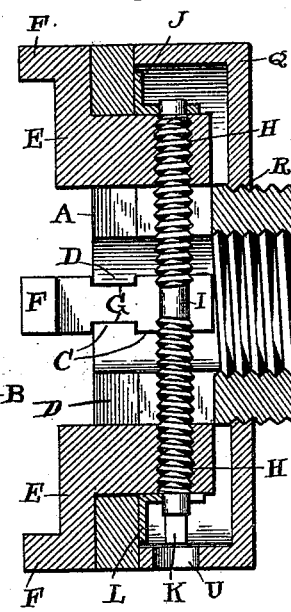
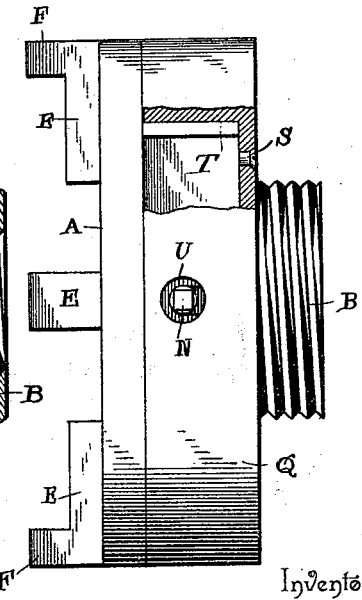
Witnesses
C. A. Ford.
D. P. Whaupter
By their Attorneys,
C. A. Snow & Co.
Inventors
Solomon Coons,
Enos O. Rogers,

UNITED STATES PATENT OFFICE.

SOLOMON COONS AND ENOS O. ROGERS, OF ORBISONIA, PENNSYLVANIA.

LATHE-CHUCK.

SPECIFICATION forming part of Letters Patent No. 518,136, dated April 10, 1894.

Application filed October 18, 1893. Serial No. 488,511. (No model.)

*To all whom it may concern:*

Be it known that we, SOLOMON COONS and ENOS O. ROGERS, citizens of the United States, residing at Orbisonia, in the county of Huntingdon and State of Pennsylvania, have invented a new and useful Lathe-Chuck, of which the following is a specification.

This invention relates to lathe chucks; and it has for its object to construct a chuck of this character with separate sets of universal and independent jaws, whereby the chuck can be accommodated to greater variety of work and also to provide convenient adjustments of the chuck to concentric or eccentric work.

To this end the main and primary object of the invention is to effect simple and efficient improvements in the operating devices for chuck jaws, and also the specific manner of mounting the chuck parts.

With these and other objects in view the same consists in the novel construction, combination and arrangement of parts hereinafter more fully described, illustrated and claimed.

In the accompanying drawings:—Figure 1 is a face view of the lathe chuck constructed in accordance with this invention. Fig. 2 is a rear elevation of the chuck with the flanged casing cap removed. Fig. 3 is a sectional view on the line $x$—$x$ of Fig. 1. Fig. 4 is a similar view on the line $y$—$y$ of Fig. 1. Fig. 5 is a side view, partly in section, of the chuck.

Referring to the accompanying drawings, A represents the chuck face plate or head from the rear side of which extends the central chuck hub B, exteriorly and interiorly threaded at the outer end thereof and adapted to be secured on a lathe spindle in the ordinary manner, whereby the chuck will be mounted for chucking or holding the work to be operated upon, as well as tools if so desired.

The face plate and hub of the chuck are provided with a radial series of registering slots C, the slots in the face plate being somewhat narrower than those in the hub so as to form inwardly projecting guide ribs D, for the radially adjustable chuck jaws E. All of the radially adjustable chuck jaws E, are provided with exposed stepped portions F, of the ordinary construction, and which provide for clamping the jaws onto the work without extreme adjustments thereof, and said radially adjustable jaws E, are provided in opposite sides thereof with the grooves G, which loosely embrace the inwardly projecting guide ribs D, formed by the side edges of the slots in the face plate of the chuck. The several radially adjustable chuck jaws are further provided in the inner portions thereof, which work in the slots of the hub, with the threaded openings H, extending entirely therethrough. The threaded openings H, in one pair or set of diametrically opposite jaws E, are engaged by separate portions of a single right and left screw threaded adjusting screw I, which provides for the simultaneous adjustment of the jaws, engaged thereby, to and away from the center of the chuck. One end of the single adjusting screw I, is mounted in the flanged bearing plate J, secured to the rear side of the chuck face plate near one edge, while the other end of said single adjusting screw is squared as at K, and turns in the notched flanged bearing plate L, secured to the rear side of the face plate diametrically opposite to the location of the bearing plate J. The squared end of the single adjusting screw H, is adapted to receive the squared socket L', at one end of the adjusting key M, employed for the purpose of adjusting all of the jaws of the chuck.

The two jaws or pair of jaws connected by the single adjusting screw are universally adjustable, while the other remaining jaws, forming the other set or pair, are each separately and independently adjustable, and are adapted to have their threaded openings H, engaged by the short separate adjusting screws N. The short separate adjusting screws N, which control the adjustment of the independent chuck jaws, are provided with outer squared ends $n$, adapted to receive the key socket, and adjacent to such squared extremities are provided with the annular bearing grooves O, engaging the bearing notches P, in the flanged bearing plates L, similar to the one previously described, and similarly located.

As clearly illustrated in the drawings the operating mechanism or adjusting devices for the chuck jaws are arranged on the rear side of the chuck face plate or head, and have no portion thereof project beyond the periphery of such face plate or head, so as to be entirely inclosed by the flanged casing cap Q. The flanged casing cap Q, is provided with an enlarged central threaded opening R, which is adapted to removably engage the exteriorly threaded portion of the chuck hub, so that such cap may be screwed tight up against the inner face of the face plate or head and flush with the periphery thereof, after which such cap may be additionally secured by means of the removable screws S, passing therethrough and engaging the flanged strengthening ribs T, projecting from the inner face of the face plate and the top of the hub between the flanged bearing plates. The said casing cap is of course easily removable to gain access to the interior of the chuck, and is provided in its peripheral flange with the key openings U, arranged directly over the squared ends of the several adjusting screws, so as to permit the adjusting key to be brought into engagement with the adjusting screws to operate the same.

It will be apparent that by constructing a chuck as herein described, a perfectly smooth body is formed with no projecting ends or parts to catch the operator while working around the lathe, and also that the specific construction thereof renders the same specially efficient for lathe work.

Changes in the form, proportion, and the minor details of construction may be resorted to without departing from the principle or sacrificing any of the advantages of this invention.

Having thus described the invention, what is claimed, and desired to be secured by Letters Patent, is—

1. In a lathe chuck, the combination of the chuck face plate and the hub provided with a radial series of slots, a series of strengthening ribs projected from the inner face of the face plate and the top of the hub, separate pairs of universally and independently adjustable chuck jaws mounted to slide in said slots and having threaded openings in the inner portions thereof, diametrically arranged flanged bearing plates secured to the inner side of the face plate near its periphery and certain of which are provided with bearing notches, a single adjusting screw mounted in the bearing plates and having separate right and left screw threaded portions engaging the threaded openings in the universally adjustable jaws, separate and independent adjusting screws engaging the threaded openings of the independently adjustable jaws, all of said screws having outer squared key ends turning the notched bearing plates, and a flanged casing cap arranged on the hub and secured against the outer edges of said strengthening ribs, said cap being flush with the periphery of the face plate and having a series of key openings, substantially as set forth.

2. In a lathe chuck, the combination of the chuck face plates and rearwardly projecting hub provided with radial slots, said hub being exteriorly and interiorly threaded at its outer end, the radial chuck jaws mounted in the face plate and hub and provided with threaded openings, the adjusting screws for the jaws having outer squared key ends, and the removable flanged casing cap engaging the exterior threads of the hub and fitting close up against the inner face of the face plate, said cap being flush with the periphery of the face plate and having a series of key openings arranged directly over the squared ends of the several adjusting screws, substantially as set forth.

In testimony that we claim the foregoing as our own we have hereto affixed our signatures in the presence of two witnesses.

SOLOMON COONS.
    ENOS O. ROGERS.

Witnesses:
 J. M. STEESE,
 JUDSON LOCKE.